April 16, 1929.　　　L. SIMMONS　　　1,709,411
DISPENSER FOR CREAMS AND THE LIKE
Filed Nov. 19, 1928
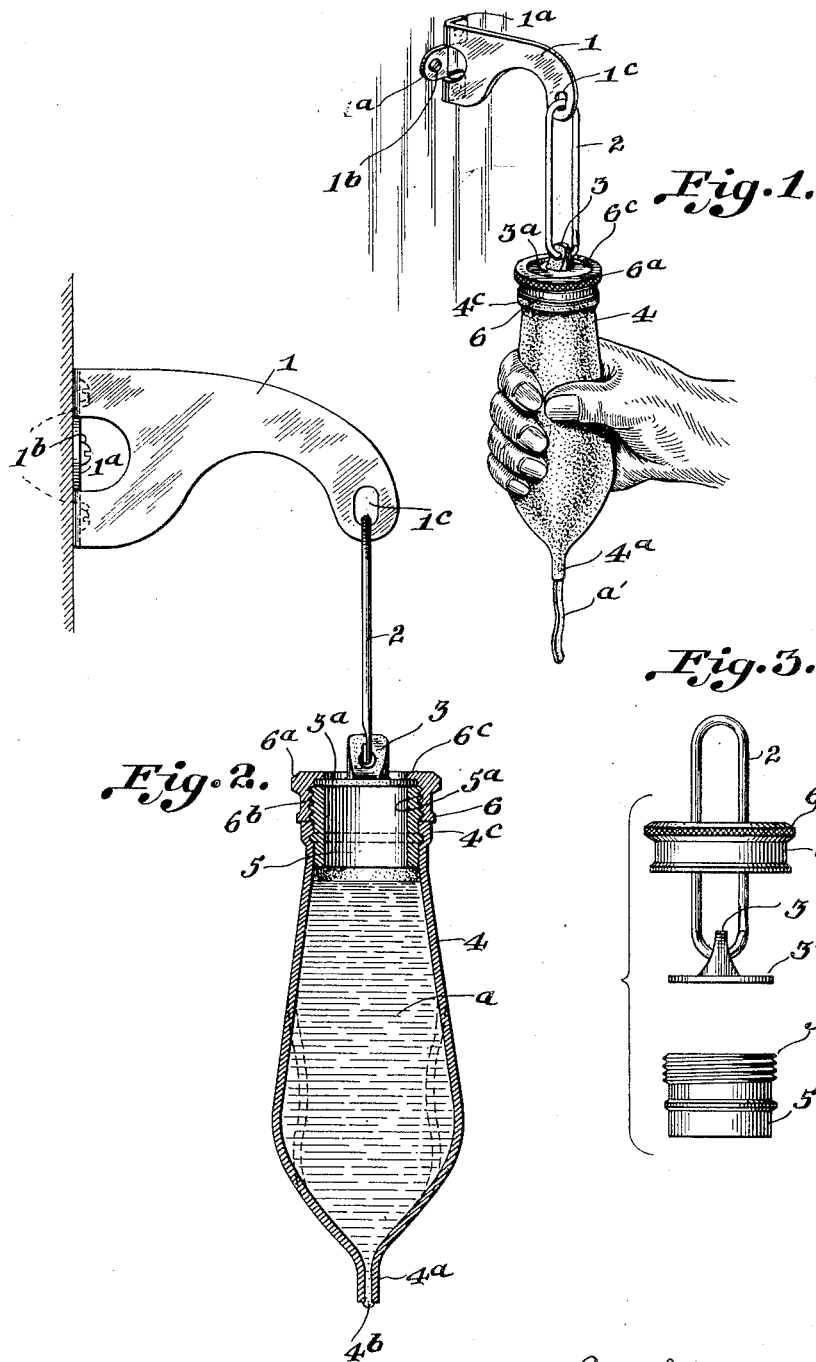
Inventor
Leo Simmons
By Herbert Peck, Attorney Patented Apr. 16, 1929.

1,709,411

UNITED STATES PATENT OFFICE.

LEO SIMMONS, OF WASHINGTON, DISTRICT OF COLUMBIA.

DISPENSER FOR CREAMS AND THE LIKE.

Application filed November 19, 1928. Serial No. 320,449.

This invention relates to dispensers for various paste-like creams used for the toilet and for medicinal purposes, and is particularly designed as an artistic and sanitary fixture or accessory for the bathroom; and the objects and nature of the invention will be understood by those skilled in the art in the light of the following explanation of the accompanying drawings that illustrate what I now believe to be the preferred mechanical expression or embodiment of my invention from among other forms, constructions and combinations within the spirit and scope thereof.

An object of the invention is to provide an improved simple, comparatively-inexpensive, decorative, easily understood and operated fixture or accessory for the bathroom, lavatory, and the like, for dispensing in a cleanly sanitary manner, various paste-like creams, such as cream soap, tooth paste, face and other pastes or creams, and healing and other unguents and salves and the like.

With the foregoing and other objects in view, the invention consists in certain novel features in construction and arrangements and in novel combinations, as more fully and particularly described and specified hereinafter.

Referring to the accompanying drawings, forming a part hereof:

Fig. 1 is a perspective view of an embodiment of my dispenser, a hand being shown in the act of forcing discharge therefrom a ribbon or length of cream or paste for use.

Fig. 2 is sectional elevation on an enlarged scale.

Fig. 3 is a detail elevation of certain elements that constitute the closure and supporting means for the flexible collapsible container, said elements being shown spaced apart in abnormal positions, the flexible dispensing container not being shown.

The particular embodiment disclosed by the drawings as an example for purposes of explanation, embodies a simple inexpensive, one-piece forwardly extending supporting or bracket arm 1, of metal or other suitable material, having a base 1$^a$, for securing to a vertical wall or other support in any suitable manner, as by screws or other means, 1$^b$. To the outer or free end of this horizontal or forwardly projecting bracket 1, is loosely coupled, a freely swingable depending hanger, here shown in the form of an elongated link or closed loop 2, passing loosely through and confined to a transverse eye 1$^c$, in the outer end of the bracket, and at its closed lower end, passing loosely through an upstanding eye formed by a transverse perforation through a central upstanding lug or ear 3, rigid with a part or member of the supporting closure of a depending flexible collapsible pendant dispensing container 4, in which is stored the ample supply of cream or paste $a$, to be gradually dispensed as needed, from the lower end thereof through an orifice of small capacity in the form of a descending stream or ribbon $a'$, of any desired cross sectional form, by collapsing pressure applied externally to the container.

The container 4, is preferably in attractive bulging vertically-elongated pendant form, terminating at the bottom in a restricted depending discharge nozzle 4$^a$, having a longitudinal duct leading down from the storage chamber within the container to a bottom discharge or outlet orifice 4$^b$, of the desired cross sectional formation, through which the cream is caused to exude, in a narrow or small descending stream, as pressure is externally applied by the fingers or hand to the upper or storage body of the container.

This container 4, is preferably composed of durable flexible rubber or equivalent material molded in one piece with thin flexible walls, imperforate except at its top mouth and bottom discharge orifice, and preferably of sufficient stability and elasticity to maintain its original or permanent shape and form and to return to such shape and form after the external cream exuding pressure is released. The formation and size of the discharge orifice are such as to prevent objectionable unsanitary dripping or leakage of paste or cream, as the discharge nozzle is designed for use without the necessity of providing the same with a valve for opening and closing the same, or a separate exterior or other closure. The prevention of objectionable seepage or discharge through the orifice is aided by the non-fluid character of the cream or paste within the container, the tendency of the cream to harden when exposed to air and thus plug the orifice (see Fig. 2), the elastic tendency of the rubber to contract and thus normally and yieldingly reduce the capacity of such duct from the capacity thereof when distended by the exudation of the cream therethrough under the force of the contracting pressure.

The collapsible container 4, is molded with an upwardly mouth or neck 4ᶜ, surrounding the open upper end of the container, and this neck is tightly and longitudinally fitted exteriorly on and preferably permanently cemented to a metal or other hard strong material nipple 5, to form a tight joint between the exterior surface of the nipple and the surface of the container contacting therewith. The nipple 5, forming a permanent part of the container, projects upwardly therefrom and its projected portion is formed with the longitudinal exterior screw thread 5ᵃ. This longitudinally hollow open end nipple forms the rigid mouth and neck ring of the container, through which the container can be filled or charged with the paste or cream to be stored therein and dispensed therefrom. Usually, the container, when detached from its supporting closure, is filled through its said open nipple, by cream or paste supplied from jars or metal tubes constituting the original packages in which the cream is shipped by the producer thereof.

The supporting closure by which the container 4, is closed and suspended, embodies a top usually circular closure disk 3ᵃ, preferably composed of strong non-metallic yielding material, such as semi-hard rubber or celluloid of a suitable composition, and formed with the top suspending ear 3; and a separate rotary union or ring nut 6, having knurled or otherwise roughened exterior finger rim 6ᵃ, longitudinal internal screw thread 6ᵇ, and internal annular top flange 6ᶜ.

The disk 3ᵃ, fits on the nipple 5, of the container, with its under face closed against the top edge of the nipple, thereby effectively covering and closing the filling opening or mouth of the container, and is thus held in container closing position as well as in container supporting and suspending relation by the ring nut 6, the top flange 6ᶜ, of which overlaps and rests down on the top face of closure disk 3ᵃ, while the ring is screwed down tightly on the threaded upper end of the nipple 5, to clamp the disk 3ᵃ, between flange 6ᶜ, and the top edge of the nipple.

An exceedingly strong and durable suspending support for the freely hanging container is thus provided which also constitutes an effective closure for the filling mouth of the container.

This closure is by a simple and easily understood method, capable of being readily opened to permit detachment of the container for refilling, and replacement to normal operative suspended position with the container mouth closed. The container is attached to its suspending means and closed, by holding the disk 3ᵃ, and the mouth of the container together in proper relative positions, while the ring nut is rotated in the proper direction to screw the same down on the container neck nipple until the disk 3ᵃ, is tightly clamped thereby sealing same securely and thus preventing hardening of the contents of the container by air exposure. The container is released and detached from its suspending support by holding the container by its neck against rotation while the ring nut is unscrewed until clear and free of the neck nipple 5. This arrangement avoids the tendency to twist and damage the rubber container walls which might be the result should it be necessary to rotate the container in attaching and detaching the same. Attention is invited to the desirable sealing construction of the device, namely, the disk 3ᵃ and the nipple 4ᵃ, as it is essential to maintain relatively an airtight chamber for the cream-like substance intended to be used therein and to prevent the hardening of same in the container, except at the tip of the nipple 4ᵃ. A small plug of the contents preferably hardens at the end of the nipple 4ᵃ, while mouth 5ᵃ, being sealed by 3ᵃ, as aforesaid, the contents will be preserved in its original state for a long time.

I do not wish to limit all features of my invention to any particular means or method for attaching and detaching the container from its support.

What I claim is:

1. A dispenser for toilet creams and the like, embodying a supporting bracket; a freely hanging flexible cream storing and dispensing container having a bottom cream exuding orifice, and means for supporting and suspending said container from said bracket, said container having a top filling mouth, said means embodying a closure normally closing said mouth and whereby said container is separable from said means for filling.

2. A dispenser for creams and the like, embodying a flexible rubber-like storage compressible container having a top filling mouth and a bottom discharge cream exuding orifice formed against normal cream leakage; and means for supporting said container from its upper end, said container being detachable from said means and having its mouth normally sealed and closed thereby.

3. A dispenser for creams and the like, embodying suspending supporting means, and a flexible collapsible storage and dispensing cream container detachably coupled at its upper end to said means and supported thereby, said container having a normally closed and sealed top filling mouth and an uncovered restricted bottom discharge orifice capable of distending to exude cream under cream dispensing pressure exteriorly applied to the body of the container.

4. A dispenser for creams and the like, embodying a flexible compressible rubber cream storage container having a normally closed filling opening, said container at its lower end formed with a depending nozzle having a small capacity longitudinal duct from the storage chamber of the rubber container and providing a restricted cream exuding orifice capable of dispensing cream from the container when the container walls are compressed inwardly, and means for supporting said container while accessible for squeezing the same by hand to cause such exudation through and from said nozzle.

5. A dispenser for creams and the like, comprising a hanger and its support, a container supporting closure suspended and carried by said hanger, a hanging pendant flexible and compressible walled cream storage container having a bottom discharge orifice and a normally closed top filling opening, and screw thread means whereby said container is detachable from and attachable to said sealed closure and normally supported thereby.

6. In combination, a cream storing and dispensing container composed of flexible compressible rubber or the like and having a filling opening with a permanent stiff neck nipple, said container having a projecting nozzle with a cream exuding orifice for dispensing cream by exudation when the container walls are subjected to exteriorly applied compressing pressure, and a suspending support for said container embodying screw threaded means and a sealed closure for said neck nipple.

7. In combination, a supporting hanger embodying a closure disk, a flexible compressible walled cream storage container having a cream exudation discharge and a top filling opening and rigid neck, and screw threaded means for normally coupling said disk and neck together with the container supported thereby and hanging therefrom.

Signed at Washington, D. C., this 15th day of November, 1928.

LEO SIMMONS.